(No Model.)  3 Sheets—Sheet 1.

G. WILSON.
PLOW.

No. 360,075.  Patented Mar. 29, 1887.

Witnesses
A. M. Gaskell
R. H. Sanford

Inventor
George Wilson,
By A. C. Paul,
Atty.

(No Model.) 3 Sheets—Sheet 3.

G. WILSON.
PLOW.

No. 360,075. Patented Mar. 29, 1887.

Witnesses
A. M. Gaskell
R. H. Sanford

Inventor
George Wilson
By A. C. Paul
Atty

United States Patent Office.

GEORGE WILSON, OF MINNEAPOLIS, MINNESOTA, ASSIGNOR TO CLARENCE SPUR, OF HOUGHTON, DAKOTA TERRITORY.

PLOW.

SPECIFICATION forming part of Letters Patent No. 360,075, dated March 29, 1887.

Application filed November 23, 1886. Serial No. 219,570. (No model.)

*To all whom it may concern:*

Be it known that I, GEORGE WILSON, of Minneapolis, in the county of Hennepin and State of Minnesota, have invented certain Improvements in Plows, of which the following is a specification.

This invention relates to improvements in gang or sulky plows; and the objects I have in view are to provide a plow of this class in which, when the plows proper are from the ground, the wheels will stand at the same level, and when they are lowered the land-wheel will be at a higher level than the other, and in which the difference between the wheels may be regulated to suit the character of the ground upon which the plow is used.

The invention consists, generally, in a gang or sulky plow having its wheels mounted upon independent axles, which are provided with cranks or bends and connected means for turning said axles, whereby the plows are raised or lowered.

The invention further consists in means connecting the two axles, whereby, when they are turned to raise the plows, the wheels are brought to the same level, and when they are turned in the opposite direction to lower the plows, one wheel is brought to a lower level than the other, thus keeping the plows level, whether they are raised from the ground and the wheels stand on the same level or are in the ground and one wheel is in the furrow and the other at a higher level on the unplowed ground.

The invention further consists in adjusting means connected with one of said axles, whereby the relation of the two axles may be changed and the difference in the throw of the axles may be regulated.

The invention further consists in means, under the control of the person riding the plow, for locking the pivoted yoke in which the caster-wheel at the rear of the plow is journaled.

The invention further consists in the construction and combination hereinafter described, and pointed out in the claims.

Figure 1:
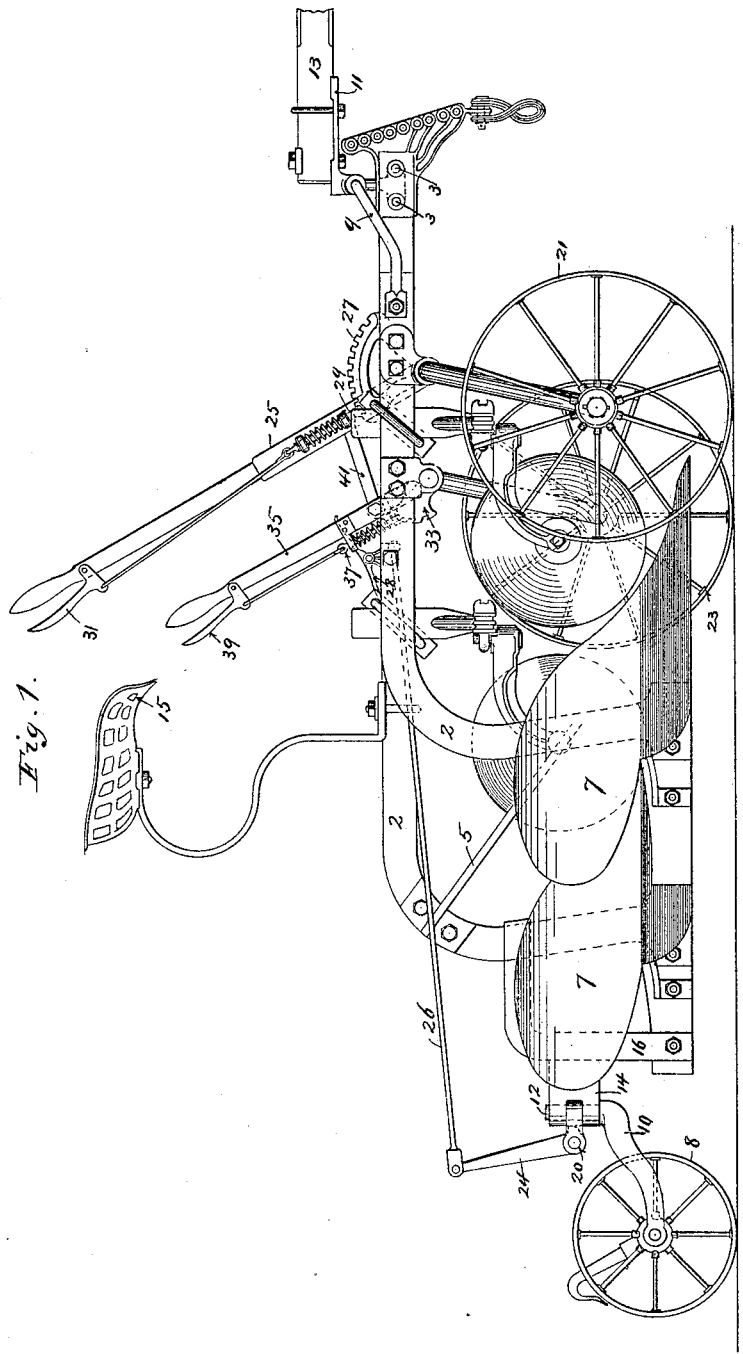
Figure 2:
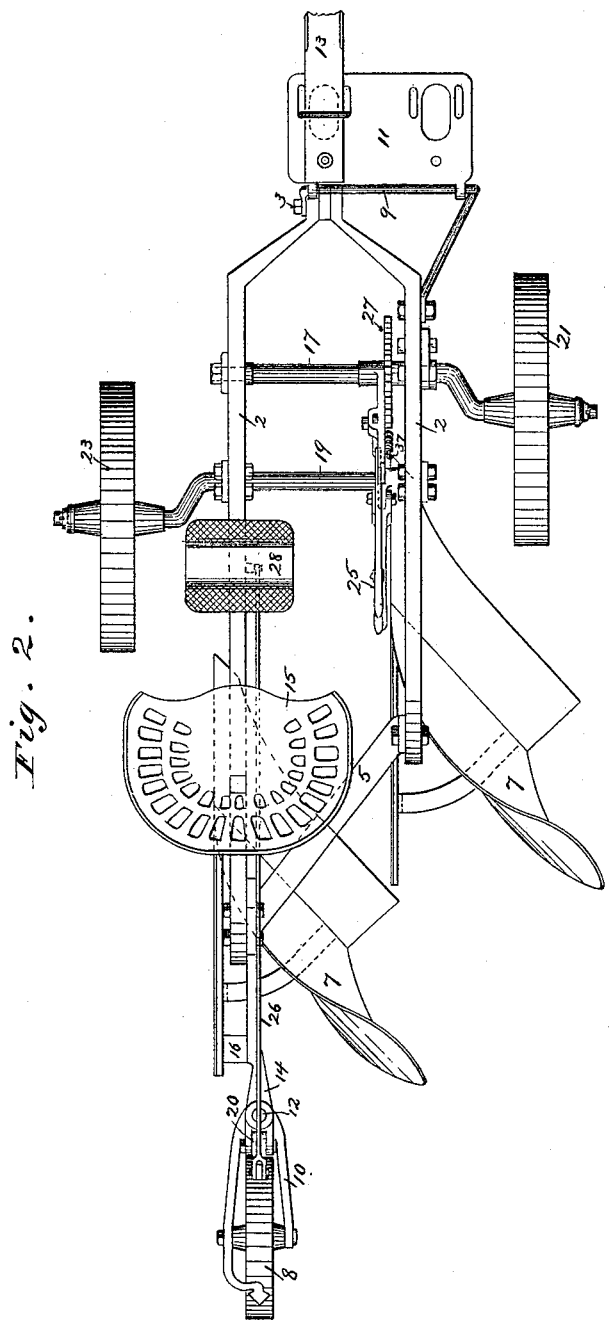
Figure 3:
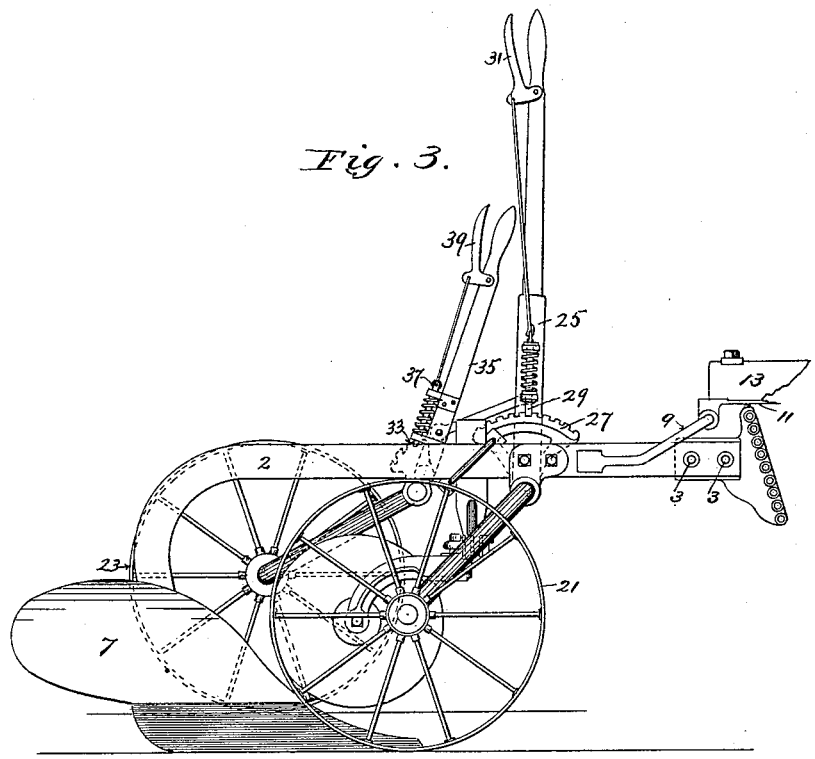
Figure 4:
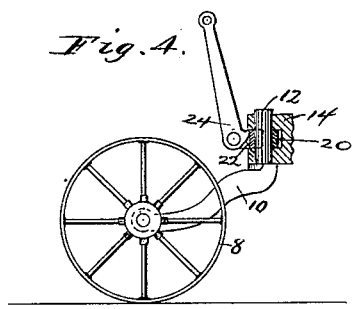

In the accompanying drawings, forming part of this specification, Figure 1 is a side elevation of a gang-plow embodying my invention. Fig. 2 is a plan view of the same. Fig. 3 is a partial side elevation showing the parts in different position. Fig. 4 is a detail showing the means for locking the caster-wheel.

In the drawings, 2 2 represent the beams of a gang-plow. At the forward end they are joined together and are secured by suitable bolts, as 3. At the rear the beams are connected by a brace, 5, which extends, preferably, diagonally from one beam to the other, as shown in Figs. 1 and 2. The rear ends of the beams extend downwardly in the usual manner, and to them the plowshares 7 are secured, one being in advance of the other, in the usual way. The plow-beams thus secured and braced form a frame of suitable strength and rigidity to support all of the parts of the plow. A rod, 9, is secured to the forward part of the frame, and upon this rod a plate, 11, is mounted. A pole, 13, is secured to the plate 11, either in line with the center of the frame, as shown in Fig. 1, which will be its position when two horses are to be used, or at one side of the center, which will be its position when three horses are to be used. A seat, 15, is secured upon one of the beams by any suitable means, as shown in Figs. 1 and 2.

Journaled in suitable boxes in the plow-beams are the independent axles 17 and 19, each of which is provided with a crank-bend between its bearings and the portion upon which the wheel is mounted. The wheels 21 and 23 are mounted upon the ends of the axles in the usual manner. One axle is arranged in front of the other, which causes one wheel to be in advance of the other.

Upon the forward axle, 17, is secured a lever, 25, which extends upward into a convenient position to be grasped by a person seated on the seat 15. The lever may be provided with a square or rectangular hole adapted to fit upon a correspondingly-shaped portion of the axle, or it may be secured thereto by other suitable means that will cause the axle to turn with the lever. A notched locking plate or quadrant, 27, is secured to the beam with its center coincident with the center of the axle. The lever is provided with a spring-latch, 29, that is adapted to engage the notches on the quadrant, and has a pivoted handle, 31, by which the latch may be operated.

The rear axle, 19, has a notched quadrant, 33, secured to it by any suitable means. A lever, 35, is pivoted upon this quadrant, and is provided with a spring-latch, 37, which is adapted to engage the notches in the quadrant, and has a handle, 39, by which it may be operated. When the lever 35 is locked to the quadrant 33, the axle 19 becomes the pivot of the lever, and as the lever is moved the axle is turned in its bearings. When the latch is released from the quadrant, the lever may be turned upon the pivot by which it is secured to the quadrant without moving the quadrant or the axle.

A connecting-bar, 41, is pivoted to the lever 25 and to the lever 35. The point at which this bar is pivoted to the lever 25 is farther from the axle 17 than the point at which it is pivoted to the lever 35 is from the axle 19. When the lever 25 is moved, the forward axle is turned in its bearings, and, through the connecting-bar 41, the lever 35, and the quadrant 33, the axle 19 is also turned in its bearings, and the rear axle is turned farther than the forward axle, for the reason that the bar 41 is pivoted nearer to this axle than to the other.

When the lever 25 is thrown forward from the position shown in Fig. 1, the axles are turned backward and upward relatively to the plow-beams and the centers of the wheels and the beams are brought nearer to each other. The rear axle being turned farther than the forward one, the center of the rear wheel will be brought nearer to the plow-beams than the center of the forward one, and when at work the plows will be level while the wheels are at different levels, thus bringing them into position for the forward wheel to travel in the furrow while the other travels upon the unplowed ground. By changing the relation of the lever 35 to the quadrant 33 the difference between the throw of the axles may be regulated. By releasing the latch of the lever 35 the rear axle may be turned independently of the forward axle. This it will be found desirable to do at some times when the plow is being used upon the side of a hill.

A caster-wheel, 8, is located at the rear of the plow, and is journaled in a yoke, 10, having an upright spindle, 12, that passes through a casting, 14.

A brace, 16, is bolted to the rear plow, and the casting 14 is supported by this brace. The spindle 12 forms the pivot for the caster-wheel and turns freely in the casting 14.

It sometimes happens that the plow will be run into a stump or other obstruction, and it is then necessary to back it out, and it is desirable to back it out on the same line that it ran into the obstruction, and especially if it ran into the obstruction in turning a corner. To do this it is necessary to lock the caster-yoke in any position in which it may be and prevent it from turning while the plow is being backed. For this purpose I provide a locking device that can be operated by a pressure of the foot of the person riding the plow.

The casting 14 has an opening, 18, extending across its spindle-hole, with a straight wall at the forward side. A strap, 20, having a square end, is placed in this opening, with its end against said wall. (See Fig. 4.) The spindle 12 passes through this strap. A block, 22, is placed within the strap, and has a recess that is adapted to fit against the spindle. A cam-lever, 24, is pivoted in the strap, and the toe of the cam bears against the block 22. A rod, 26, connects the lever 24 with a pivoted foot-rest, 28, that is in position to be controlled by the person riding the plow. By a pressure of the foot upon the foot-rest the cam-lever is operated, pressing the block 22 against the spindle and locking the yoke in any position in which it may be. When the foot is raised, the lever is released and the spindle is free to turn on its axis.

A single plow may be used instead of two, as shown in the drawings.

I claim as my invention—

1. The combination, in a plow of the class described, of the independent bent axles journaled in the plow-frame, the wheels on said axles, a lever secured to one of said axles, a lever secured to the other axle, and a connecting-rod secured to both of said levers, the points of attachment of said rod with the levers being at unequal distances from the respective axles, for the purpose set forth.

2. The combination, in a plow of the class described, with the independent axles 17 and 19, mounted as described, of the lever 25, secured to said axle 17, the quadrant 33, secured to the axle 19, the lever 35, pivoted upon said quadrant and provided with the latch 37, and the connecting-bar 41, pivoted to both of said levers, substantially as described.

3. The combination, in a plow of the class described, with the axle 17, having the lever 25 secured to it, and the stationary locking-plate 27, of the axle 19, having the notched plate 33, the lever pivoted to said plate, the spring-latch 37 on said lever, and the bar 41, pivoted to both of said levers, the distance between the axle 17 and the pivot of the connecting-bar being greater than the distance between the axle 19 and the pivot of the connecting-bar, substantially as described.

4. The combination, with the plow having the support 14, of the caster-wheel, the yoke 10, and the spindle 12, passing through said support, the strap 20, passing around said spindle, the block 22, cam-lever 24, rod 26, and foot-rest 28, all substantially as described, and for the purpose set forth.

GEORGE WILSON.

Witnesses:
A. C. PAUL,
R. H. SANFORD.